US008655575B2

(12) United States Patent
Reghunath

(10) Patent No.: US 8,655,575 B2
(45) Date of Patent: Feb. 18, 2014

(54) REAL TIME ESTIMATION OF VEHICLE TRAFFIC

(75) Inventor: Riju Reghunath, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 13/076,666

(22) Filed: Mar. 31, 2011

(65) Prior Publication Data

US 2012/0253646 A1 Oct. 4, 2012

(51) Int. Cl.
*G06F 19/00* (2011.01)

(52) U.S. Cl.
USPC .......................................... 701/117; 701/118

(58) Field of Classification Search
USPC ......... 340/903, 905, 902, 933, 934, 435, 993, 340/436; 701/301, 28, 119, 117, 111, 409, 701/70, 408, 450; 345/4; 342/29; 705/1.1
See application file for complete search history.

(56) References Cited

U.S. PATENT DOCUMENTS 5,257,194 A 10/1993 Sakita
6,587,778 B2 7/2003 Stallard et al.
6,633,238 B2 10/2003 Lemelson et al.
6,937,161 B2 8/2005 Nishimura
6,985,090 B2 1/2006 Ebner et al.
7,557,731 B2 7/2009 Ramasubbu
7,725,250 B2 5/2010 Bisdikian et al.
7,804,423 B2 9/2010 Mudalige et al.
2007/0096885 A1* 5/2007 Cheng et al. ................. 340/435
2008/0204277 A1 8/2008 Sumner
2009/0048750 A1* 2/2009 Breed ............................ 701/70
2009/0167561 A1 7/2009 Liang
2009/0231160 A1 9/2009 Ramasubbu
2009/0309757 A1* 12/2009 Mudalige et al. ............ 340/905
2009/0322561 A1 12/2009 Morioka et al.
2010/0036595 A1* 2/2010 Coy et al. ...................... 701/119
2010/0253539 A1* 10/2010 Seder et al. .................. 340/903
2012/0095641 A1* 4/2012 Merk ............................. 701/28
2013/0030688 A1* 1/2013 Shimizu et al. ............... 701/301

* cited by examiner

*Primary Examiner* — Berhang Badii
(74) *Attorney, Agent, or Firm* — Moore & Van Allen PLLC

(57) ABSTRACT

A method and system for managing vehicle traffic is provided in which a request for traffic information of a traffic lane is received. Responsive to the request, a count of a number of vehicles establishing wireless communication links in the traffic lane is determined, such that a wireless communication link is established between at least a consecutive pair of vehicles in the traffic lane. In at least one embodiment, unique information associated with each of the vehicles establishing wireless communication links in the traffic lane is collected. Further, at least one or more of the count of number of vehicles or the unique information associated with each of the vehicle is sent to a control unit that controls traffic signal indicators provided to the vehicles in the traffic lane.

22 Claims, 5 Drawing Sheets

100

REAL TIME ESTIMATION OF VEHICLE TRAFFIC

FIELD OF THE INVENTION

Embodiments of the present invention relate to the estimation and management of vehicle traffic on roads.

BACKGROUND OF THE INVENTION

Today, the number of vehicles on roads is growing at an exponential rate. The growth of vehicles on roads is leading to traffic congestion. Generally, traffic congestion happens at an intersection (cross junction) of roads. To curb the traffic congestion, traffic signaling devices are installed at the intersection. The traffic signaling devices manage the movement of vehicle traffic at an intersection based on a signaling time associated with traffic signal indications generated from the traffic signal devices. The signaling time for each direction is either manually controlled or is programmed for a predefined time period based on a past history of vehicle traffic flow. For example, the time associated with traffic signal at a particular cross junction can be varied during different hours of the day based on the past history of the vehicle traffic flow.

In the case of manually controlled traffic signals, the time associated with the traffic signal is not predefined and is generally controlled manually by a traffic officer based on traffic conditions. However, when the time associated with the traffic signals is programmed, a fixed time period is associated with each indication of the traffic signals and the traffic signals operate based on the predefined time period. However, the fixed time period may not be effective for different hours of the day, for example during peak traffic hours. To overcome this problem various road traffic management methods are available.

In one road traffic management method, traffic conditions are determined through visualization technologies using real-time imaging and interactive displays. Images of moving vehicles in each traffic lane are captured using high resolution cameras and the captured images are shown on a display screen. Thereafter, the traffic condition in each traffic lane is analyzed, and the traffic is managed based on the displayed captured images. However, this method is expensive, time consuming and may not be accurate.

In another road traffic management method, the number of vehicles in each traffic lane is estimated using sensors provided at predefined locations. When a vehicle passes through a predefined location having a sensor, a vehicle counter is incremented or decremented based on the movement of the vehicle. Thereafter, the number of vehicles counted is shared with a traffic signal controller for managing traffic signal indications. However, this method also has limitations like cost, noise tolerance, coverage, and accuracy.

Hence, there exists a need to efficiently estimate traffic conditions and manage vehicle traffic.

SUMMARY

According to one embodiment of the present invention, a method for managing vehicle traffic is provided. The method includes receiving a request for traffic information of a traffic lane. Responsive to the request, the method determines a count or number of vehicles establishing wireless communication links in the traffic lane, wherein a wireless communication link is established between at least a consecutive pair of vehicles in the traffic lane.

According to another embodiment of the present invention, a system for managing vehicle traffic is provided. The system includes at least one processor and at least one transceiver. The transceiver is adapted to receive a request for traffic information of a traffic lane. The processor, responsive to the request, determines a count or number of vehicles establishing wireless communication links in the traffic lane, wherein a wireless communication link is established between at least a consecutive pair of vehicles in the traffic lane.

According to yet another embodiment of the present invention, a method for managing vehicle traffic is provided. The method includes receiving a request for traffic information of a traffic lane. The method then collects unique information associated with each of the vehicles establishing wireless communication links in the traffic lane, wherein a wireless communication link is established between at least a consecutive pair of vehicles in the traffic lane. Thereafter, the method sends the unique information to a control unit for managing traffic signals based on the unique information.

According to still another embodiment of the present invention, a computer program product comprising computer-executable instructions embodied in a computer-readable medium is provided. The method includes receiving a request for traffic information of a traffic lane. The method then collects unique information associated with each of the vehicles establishing wireless communication links in the traffic lane, wherein a wireless communication link is established between at least a consecutive pair of vehicles in the traffic lane. Thereafter, the method sends the unique information to a control unit for managing traffic signals based on the unique information.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION OF THE INVENTION

Figure 1:
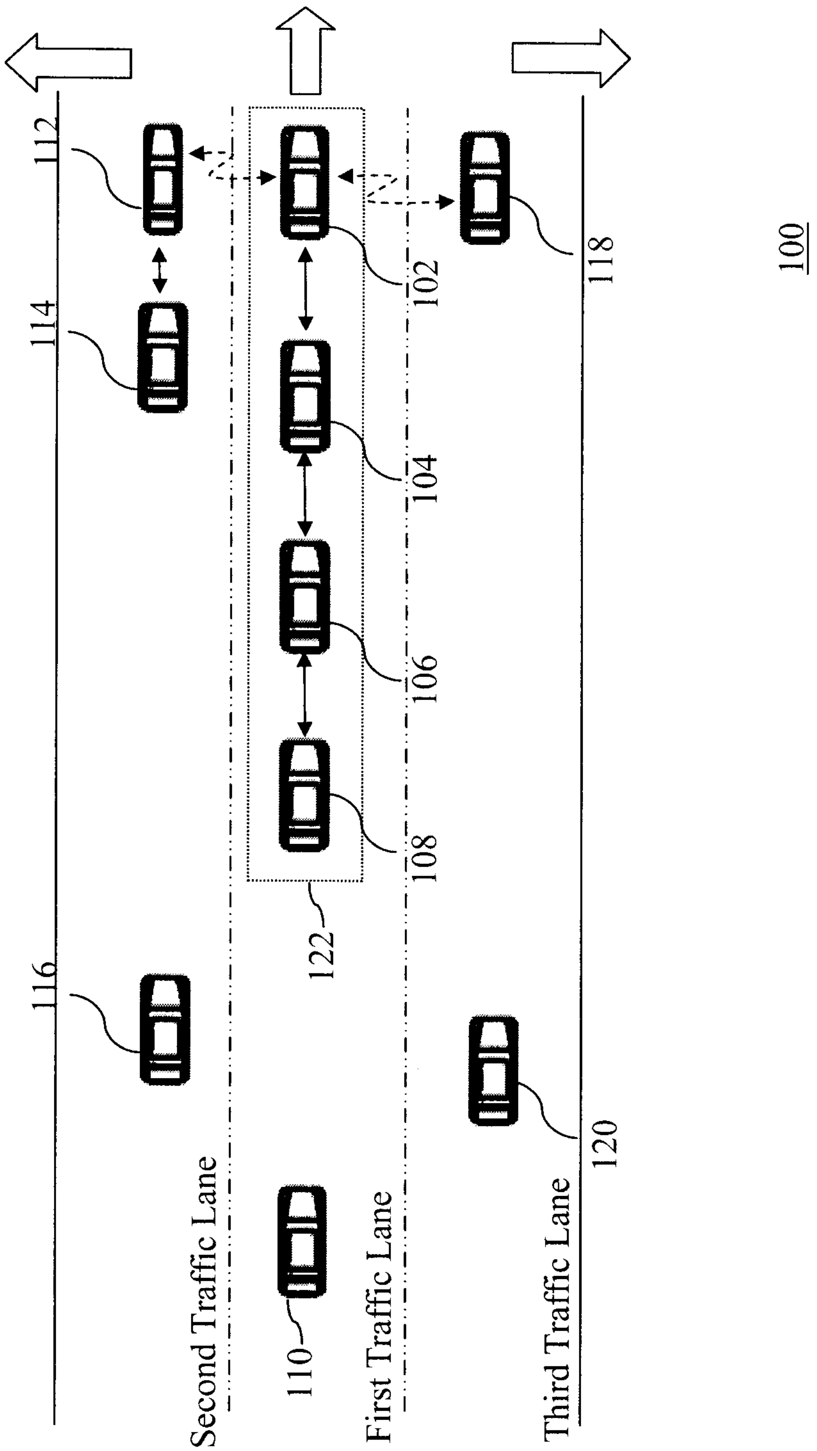
FIG. 1 illustrates an exemplary representation of group of vehicles establishing wireless communication links, in accordance with an embodiment of the invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to “one embodiment” or “an embodiment” (or the like) means that a particular feature, structure, or characteristic described in connection with the embodiment is included in at least one embodiment of the invention. Thus, appearances of the phrases “in one embodiment” or “in an embodiment” or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that various embodiments of the invention described herein may be able to be practiced without one or more of the specific details of another embodiment described herein, or with other methods, components, materials, et cetera. without foregoing the inventiveness otherwise described herein. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Further, terms such as “first”, “second”, etc., are used to differentiate between objects having the same terminology and are nowhere intended to represent a chronological order, except where stated otherwise. A set is defined as a non-empty set including at least one element.

FIG. 1 illustrates an exemplary representation of a group of vehicles establishing wireless communication links, in accordance with an embodiment of the invention.

Referring to FIG. 1, an environment 100 is shown to include vehicles moving in different traffic lanes. The different traffic lanes include a first traffic lane, a second traffic lane and a third traffic lane. The different traffic lanes are associated with different traffic directions at an intersection of roads. For example, vehicles heading towards a straight direction from the intersection of roads moves in the first traffic lane. Further, the vehicles heading towards a left direction (taking a left turn) from the intersection of roads will move in the second traffic lane. Similarly, the vehicles heading towards a right direction (taking a right turn) from the intersection of road will move in the third traffic lane.

In the environment 100, a vehicle 102, a vehicle 104, a vehicle 106, a vehicle 108 and a vehicle 110 are associated with the first traffic lane and move towards the straight direction from the intersection of roads. Similarly, a vehicle 112, a vehicle 114 and a vehicle 116 are associated with the second traffic lane and a vehicle 118 and a vehicle 120 are associated with the third traffic lane.

In an embodiment, the intersection of road is associated with a traffic signal controller. Thus, the vehicles will move from the intersection of roads based on traffic signal indications from the traffic signal controller. Generally, the traffic signal indications include a green color indication and a red color indication. The green color indication indicates “Go” permitting the vehicles to move from the intersection of roads. The red color indication indicates “Stop” requiring the vehicles to stop at the intersection of road.

The vehicles associated with the different traffic lanes will wait at the intersection of road or will move ahead from the intersection of roads based on the traffic signal indication provided by the traffic signal controller. In an embodiment, the traffic signals indications are managed in real time based on traffic information received from the vehicles waiting at the intersection of roads for traffic signal indications.

In the environment 100, the vehicles 102, 104, 106 and 108 in the first traffic lane are waiting at the intersection of roads, and the vehicle 110 is moving towards the intersection of roads. In the second traffic lane, the vehicle 112 and 114 are waiting at the intersection and the vehicle 116 is moving towards the intersection. In the third traffic lane, the vehicle 118 is waiting at the intersection and the vehicle 120 is moving towards the intersection.

The traffic signal indication can be managed based on the traffic information received from the at least one vehicle from each traffic lane. In an embodiment, a vehicle from each traffic lane may send traffic information of each traffic lane to a traffic signal controller. This is explained in detailed in conjunction with FIG. 2.

The traffic information in each traffic lane is determined after establishing wireless communication links between the vehicles in the same traffic lane. In an embodiment, a wireless communication link is established between a consecutive pair of vehicles in the traffic lane. For establishing the wireless communication links between the vehicles in the first traffic lane, for example, the vehicle 102 will identify the surrounding vehicles using a wireless communication method. In an embodiment, the vehicle 102 will identify the surrounding vehicles based on wireless communication signals broadcasted by the surrounding vehicles. The surrounding vehicles are within a predefined communication range of the vehicle 102. In an embodiment, the wireless communication links is established using a Dedicated Short Range wireless Communication (DSRC) protocols.

The DSRC is an Institute Of Electrical And Electronics Engineers (IEEE) 802.11 based wireless technology standard. The DSRC includes a one way or a two way short range wireless communication channels that are designed for vehicle use. The DSRC enables vehicle to vehicle (V2V) and vehicle to infrastructure (V2I) communications in very short time frames. The DSRC also provide data communication between vehicles by using radio frequencies in the 5,725 MHz to 5,875 MHz band.

Hence, the vehicle 102 will identify the vehicles 104, 112 and 118 based on the wireless communication signals received from the vehicles in the predefined wireless communication range. Thereafter, the vehicle 102 will determine the location of the vehicle 104, 112 and 118. In an embodiment, the location of the vehicles is determined using a Global Positioning System (GPS). In an embodiment, the GPS will identify longitude, latitude, elevation, velocity, and vehicular dimensions of the vehicles.

The vehicle 102 will then identify and select a vehicle that is behind the vehicle 102 and is also in the first traffic lane based on the determined location coordinates. Thus, the vehicle 102 will select the vehicle 104 that is towards the rear side and is in the first traffic lane. Thus, the vehicle 102 will not select the vehicle 112 and 118 that are in second traffic lane and third traffic lane respectively.

The vehicle 102 will then establish a wireless communication link with the selected vehicle 104. In an embodiment, the wireless communication link is a bidirectional wireless communication link. Thereafter, the vehicle 104 will perform the same method as mentioned above and will identify a vehicle that is at the rear side of the vehicle 104 and is also in the first traffic lane. Hence, the vehicle 104 will select the vehicle 106 and will establish a wireless communication link. Similarly, the vehicle 106 will select the vehicle 108 and establishes the wireless communication link.

In the environment 100, the vehicle 108 will not select any other vehicle as there is no vehicle around the vehicle 108 within the predefined communication range. Therefore, the vehicle 110 in the first traffic lane will not be a part of a wireless communication link 122. This is because the vehicle 108 was not able to identify the vehicle 110 using the wireless communication method.

In an embodiment, information can be exchanged between the vehicles establishing wireless communication links. For example, the vehicle 108 can send an indication to the vehicle 106 regarding an end of the wireless communication chain. In an embodiment, the vehicle 108 will send a unique data set associated with the vehicle 108. The vehicle 106 will then send the indication regarding the end of wireless communication chain, the unique data associate with the vehicle 108, and a unique data set associated with the vehicle 106 to the vehicle 104. The vehicle 104 will then send similar indication and information to the lead vehicle 102. Hence, the vehicle 102 receives the indication regarding the end of the wireless communication chain and collects the unique data set associated with each vehicle establishing the wireless communication.

Hence, the wireless communication chain 122 is established between the vehicles 102, 104, 106 and 108 in the first traffic lane. In an embodiment, the wireless communication link 122 is a linear wireless communication link. Similarly, a wireless communication chain (link) is also established between the vehicle 112 and the vehicle 114 in the second traffic lane.

Figure 2:
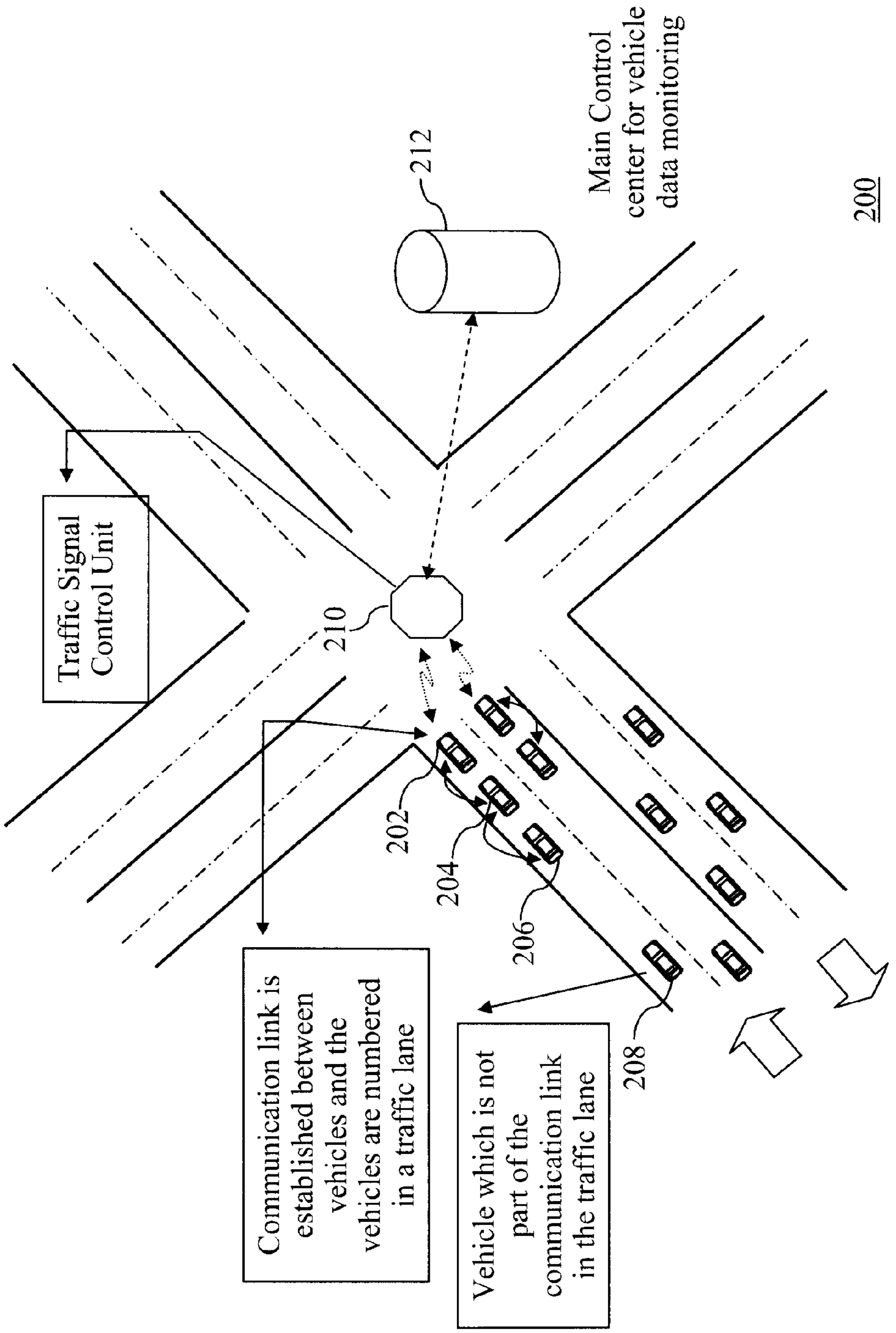
FIG. 2 illustrates an exemplary representation of a group of vehicles establishing wireless communication links and sending real-time traffic information to a control unit, in accordance with an embodiment of the invention.

FIG. 2 illustrates an exemplary representation of a group of vehicles establishing a wireless communication link and sending real-time traffic information to a control unit, in accordance with an embodiment of the invention.

Referring to FIG. 2, in an environment 200, a wireless communication link is established between vehicles 202, 204 and 206 in a traffic lane based on the wireless communication method and the location of the vehicles in the traffic lane. The method for establishing the wireless communication link in the traffic lane is already explained in conjunction with FIG. 1.

In the environment 200, the vehicle 208 in the traffic lane will not be a part of the wireless communication link as it is not within a predefined communication range of the vehicle 206 and wireless signals broadcasted by the vehicle 208 are not received by the vehicle 206. In an embodiment, the vehicles, after establishing the wireless communication link, will assign a unique order number to each vehicle establishing the wireless communication links. In an embodiment, the order number is based on a time of arrival of each vehicle at the intersection of roads. In another embodiment, the order number is based on the time of establishing the wireless communication link. For example, the vehicle 202 can be assigned an order number one, the vehicle 204 can be assigned an order number two and the vehicle 206 can be assigned an order number three in the wireless communication link.

Thereafter, a count of a number of vehicles establishing the wireless communication links in each traffic lane is determined and the count is thereafter sent to a traffic signal control unit 210. In an embodiment, the count is sent to the traffic signal control unit 210 using a wireless communication method. An example of wireless communication includes Bluetooth®. In an embodiment, a unique data set associated with each vehicle establishing the wireless communication links in the traffic lane is sent to the control unit 210. In an embodiment, the unique data set includes the count or number of vehicles wirelessly linked in that particular lane, the directions information of each vehicle, route map entered by each vehicle, and the like.

The traffic signal control unit 210 can then schedule the traffic signal indications based on the count of number of vehicles that are stationary at or approaching the intersection of roads in each traffic lane. In an embodiment, traffic signal control unit 210 can schedule the traffic signal indications based on the received unique data set associated with each vehicle. In an embodiment, the traffic signal control unit 210 will send traffic information to a main control center 212. The main control center 212 can use the traffic information for vehicle data monitoring.

Figure 3:
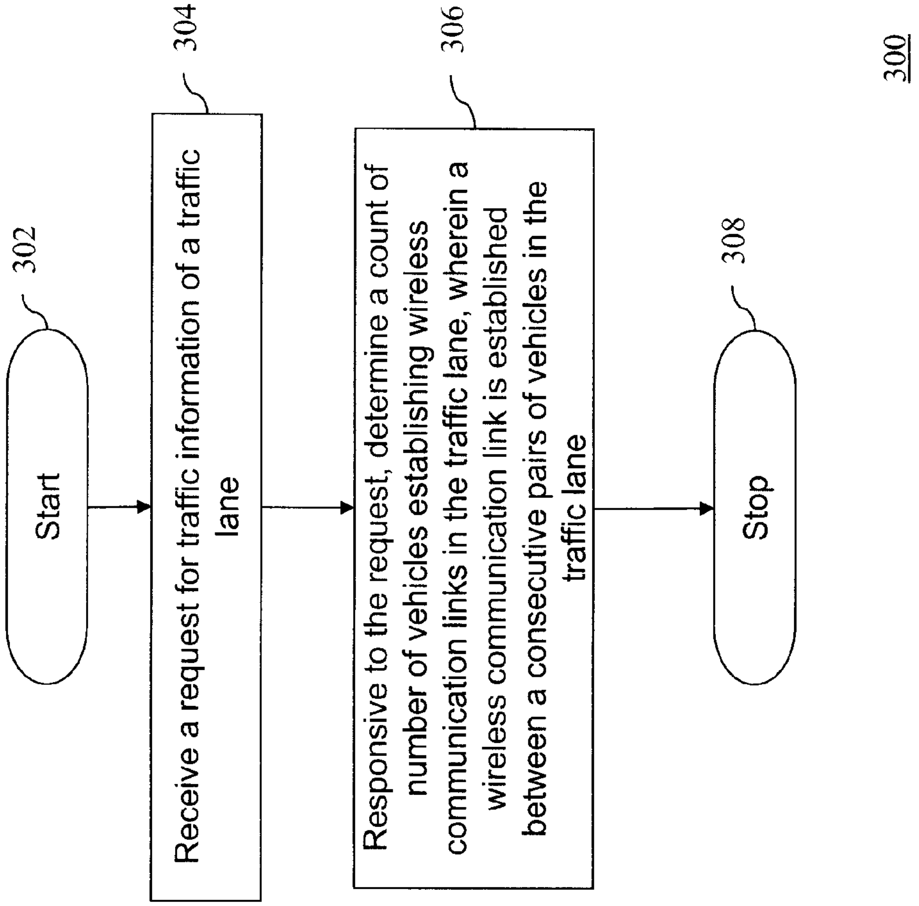
FIG. 3 illustrates a flowchart diagram representing a method to manage traffic, in accordance with an embodiment of the invention; and FIG. 4A

FIG. 3 illustrates a flowchart diagram representing a method 300 to manage traffic, in accordance with an embodiment of the invention.

Referring to FIG. 3, the method 300 is initiated at step 302. At step 304, a request is received for traffic information of a traffic lane. In an embodiment, the request is received at a lead vehicle (the vehicle 102). In an embodiment, the request is sent by a control unit (the control unit 210). The lead vehicle 102 is identified by the traffic control unit 210 based on the communication signals received from the surrounding vehicles. In an embodiment, the lead vehicle 102 is identified based on a Radio Frequency IDentification (RFID) tags. In another embodiment, the lead vehicle is identified by sensors installed at a predefined position on a lane.

In the method 300, the lead vehicle 102 identifies one or more other vehicles in the traffic lane. To this end, the lead vehicle 102 first identifies all the vehicles that are surrounding the lead vehicle 102 based on the wireless communication signals broadcasted by the surrounding vehicles. Hence, in the wireless communication method, the lead vehicle will search for vehicles that are within a predefined communication range based on a wireless signals received from the surrounding vehicles.

The lead vehicle will then determine coordinates of each vehicle that are within the predefined communication range and are identified based on the received wireless communication signals. Thereafter, the lead vehicle 102 will identify and select a vehicle that is in the same traffic lane as the lead vehicle 102, based on the determined location coordinates. Hence, the lead vehicle 102 will identify the vehicle 104 that is in the same traffic lane, for example. Thereafter, a wireless communication link is established between the lead vehicle 102 and the vehicle 104. In an embodiment, the wireless communication link is short range wireless communication link. Examples of short range wireless communication include, but are not limited to, DSRC, Near Field Communication (NFC) and Bluetooth®.

The selected vehicle, for example the vehicle 104, will then perform the method as mentioned above and identify a vehicle that is behind the vehicle 104 in the first traffic lane. Thus, the vehicles in the first traffic lane will identify all the vehicles waiting for a traffic signal in the first traffic lane and will establish wireless communication links between the vehicles, until there is no vehicle within a predefined communication range of a vehicle in the traffic lane. Hence, the wireless communication link is established between the vehicles 102, 104, 106, and 108 in the first traffic lane. In an embodiment, the wireless communication link is established between at least a consecutive pair of vehicles in the traffic lane.

At step 306 a count of number of vehicles establishing wireless communication links in the traffic lane is determined. In an embodiment, the unique data set associated with each vehicle establishing wireless communication links in the traffic lane is collected. The traffic information is then sent to the control unit 210. Thus the count of number of vehicles can then be used for controlling the traffic signals. At step 308, the method 300 is terminated.

Figure 4A:
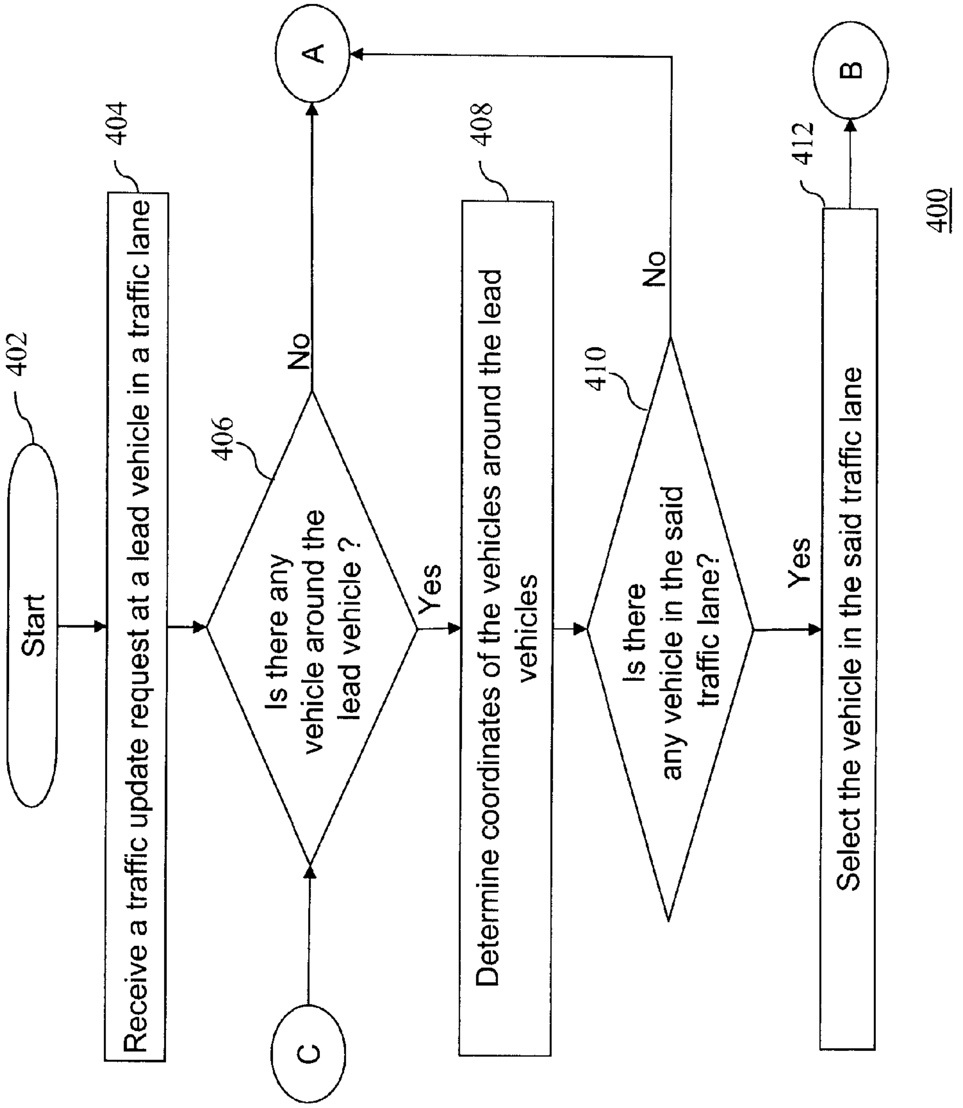
FIG. 4B illustrates a flowchart diagram representing a method to manage traffic, in accordance with another embodiment of the invention.
Figure 4B:
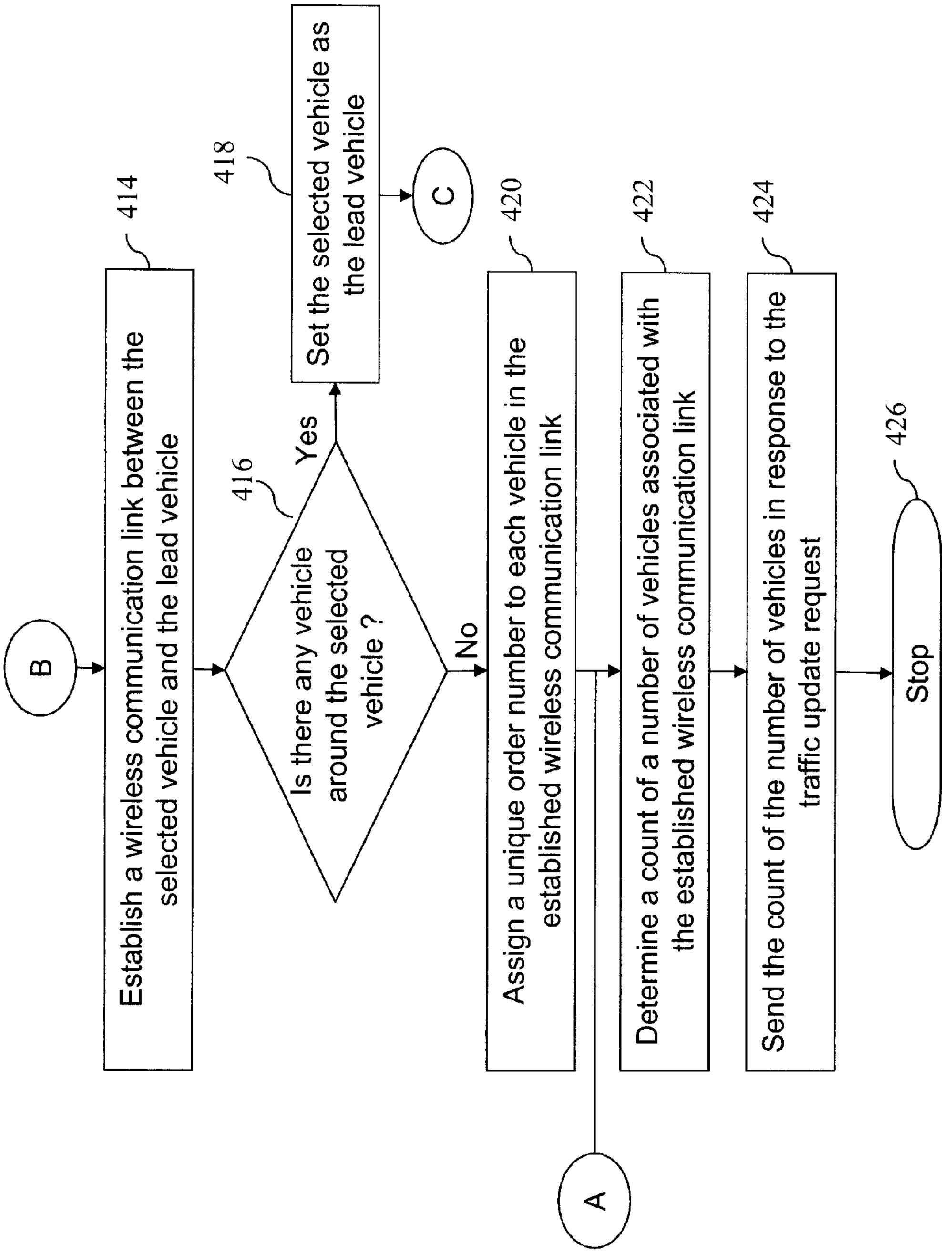

FIG. 4A and FIG. 4B illustrates a flowchart diagram representing a method 400 to manage traffic, in accordance with another embodiment of the invention.

Referring to FIG. 4, the method 400 is initiated at step 402. At step 404, a lead vehicle, for example the vehicle 102, in a traffic lane receives a traffic update request. At step 406, the method 400 will check if there are any vehicles around the lead vehicle 102. In an embodiment, the vehicles around the lead vehicle 102 are identified using a wireless communication method. In the wireless communication method, the lead vehicle 102 will identify the surrounding vehicles based on the wireless signals received from the surrounding vehicles.

If at step 406, the lead vehicle 102 identifies any surrounding vehicles then a step 408 is performed, otherwise a step 422 is performed. In an embodiment, the surrounding vehicles are identified based on the wireless communication signals broadcasted by the surrounding vehicles. At step 408, coordinates of the vehicles that are around the lead vehicle 102 is determined. For example, in the environment 100, the lead vehicle 102 identifies the surrounding vehicles 104, 112, and 118 and thereafter determines the location of the vehicles 104, 112, and 118. In an embodiment, the location of the vehicles is determined using location coordinates received from the GPS.

At step 410, the lead vehicle 102 will check if there is any vehicle behind the lead vehicle 102 in the traffic lane. At step 412, the lead vehicle 102 will select the vehicle 104 in the first traffic lane. At step 414, the lead vehicle 102 will establish a wireless communication link with the selected vehicle 104. In an embodiment, the wireless communication link is a Dedicated Short Range wireless Communication (DSRC). At step 416, the selected vehicle 104 will check if there are any vehicles around the selected vehicle 104 using the wireless communication signals. At step 416, if the selected vehicle 104 identifies any vehicle then step 418 is performed otherwise a step 420 is performed.

The selected vehicle 106 will then perform the same method that was performed by the lead vehicle 102 if there are any surrounding vehicles except the vehicle 102. Hence, at step 418 the selected vehicle 104 will be set as the lead vehicle and thereafter the step 406 is again performed. At step 420, a unique order number is assigned to each vehicle in the wireless communication link.

In an embodiment, the unique order number is assigned based on the time of arrival of the vehicles at the intersection of roads. In another embodiment, the unique order number is assigned based on the time of establishing the wireless communication link. For example, the vehicle 102 is assigned an order number one, the vehicle 104 is assigned an order number two and similarly the vehicle 106 and 108 is assigned an order number three and four consecutively.

At step 422, a count of a number of vehicles associated with the established wireless communication link is determined. In an embodiment, the count is determined by the lead vehicle. Hence, the lead vehicle 102 will determine the number of vehicles establishing the wireless communication links 122. In an embodiment, the count of number of vehicles is modified when a vehicle in the traffic lane establishes a wireless communication link in the traffic lane or abolishes an established wireless communication link. For example, in the first traffic lane, if the vehicle 106 moves out of the first traffic lane and abolishes the wireless communication link 122 then the order number is reassigned to the remaining vehicles in the first traffic lane and the count of number of vehicles is modified accordingly.

At step 424, the count of the number of vehicles is sent in response to the traffic update request. In an embodiment, the count of number of vehicles is sent to the traffic signal control unit 210. In the environment 200, the vehicle 202 will send a count of three to the traffic signal control unit 210. In an embodiment, the unique data set associated with each vehicle establishing the wireless communication links in the traffic lane is sent to the control unit 210. In an embodiment, the unique data includes the count of vehicles in that particular lane, the directions information of each vehicle, route map entered by each vehicle, and the like. Hence, the control unit 210 will identify the count of number of vehicles based on the unique data set received.

In an embodiment, the traffic signal control unit 210 is also associated with the main control centre 212 for vehicle data monitoring. In an embodiment, the traffic signal control unit 210 will receive traffic information of each traffic lane from a vehicle associated with each traffic lane. The traffic signal control unit 210 will then analyze the number of vehicles associated with each traffic lane and can thereafter manage the time of the traffic signal indications for each direction of traffic movement. At step 426, the method 400 is terminated.

Various embodiments of the present invention described above may provide at least, but are not limited to, the following advantages. The present invention provides a method for managing vehicle traffic. The method identifies traffic information, associated with each traffic direction, in real time. The method also allows scheduling of traffic signal indications based on the number of vehicles associated with each traffic lane. Further, the method assigns an order number to each vehicle based on the time of arrival of each vehicle at an intersection of roads. This allows a vehicle to take an alternate route if the order number associated with the vehicle is large. The method provides an inexpensive and accurate method of identifying vehicles in the traffic lanes.

As will be appreciated by one skilled in the art, aspects of the present invention may be embodied as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for managing vehicle traffic, the method implemented by at least one processing device and comprising:

receiving, by at least one processing device associated with a first vehicle in a traffic lane, a request for traffic information of the traffic lane;

establishing, by at least one processing device, a wireless communication link with a device associated with at least one other second vehicle adjacent to the first vehicle and only in the traffic lane;

responsive to the request, determining, by at least one processing device, a count of a number of vehicles establishing wireless communication links in the traffic lane; and sending, by at least one processing device, the count to a control unit for managing traffic signals.

2. The method of claim 1 further comprising identifying vehicles in the traffic lane based on wireless communication signals broadcasted by the vehicles and location coordinates of the vehicles.

3. The method of claim 2, wherein the location coordinates of the vehicles is determined using a Global Positioning System (GPS).

4. The method of claim 1 further comprising:

collecting unique information associated with each of the vehicles establishing wireless communication links, wherein the unique information includes at least one of an order number, a vehicle name, a travelling direction, and dimensions of the vehicles; and sending the unique information to the control unit for managing traffic signals based on the unique information.

5. The method of claim 1, wherein establishing the wireless communication links comprises establishing wireless communication links using a Dedicated Short Range wireless Communication (DSRC) protocol, wherein the wireless communication links collectively create a bidirectional wireless communication chain between the vehicles in the traffic lane.

6. The method of claim 1, further comprising responsive to modifications in the wireless communication links re-determining the count of number of vehicles establishing wireless communication links in the traffic lane.

7. The method of claim 1 further comprising assigning an order number to the vehicles establishing the wireless communication links based on at least one of the location of the vehicles in the traffic lane and a time of establishing the wireless communication links.

8. A system for managing vehicle traffic, the system comprising at least one processor and at least one transceiver wherein:

the at least one transceiver is associated with a first vehicle in a traffic lane and is adapted to:

receive a request for traffic information of the traffic lane; and the at least one processor is associated with the first vehicle in the traffic lane and is adapted to:

establish a wireless communication link with a device associated with at least one other second vehicle adjacent to the first vehicle and only in the traffic lane;

responsive to the request, determine a count of a number of vehicles establishing wireless communication links in the traffic lane; and send the count to a control unit for managing traffic signals.

9. The system of claim 8, wherein the processor is further adapted to identify vehicles in the traffic lane based on wireless communication signals broadcasted by the vehicles and location coordinates of the vehicles.

10. The system of claim 9, wherein the location coordinates of the vehicles is determined using a Global Positioning System (GPS).

11. The system of claim 8, wherein the processor is further adapted to collect unique information associated with each of the vehicles establishing wireless communication links, wherein the unique information includes at least one of an order number, a vehicle name, a travelling direction, vehicle count and dimensions of the vehicles; and the transceiver is further adapted to send the unique information to the control unit for managing traffic signals based on the unique information.

12. The system of claim 8, wherein the processor is further adapted to establish wireless communication links using a Dedicated Short Range wireless Communication (DSRC) protocol, wherein the wireless communication links collectively create a bidirectional wireless communication chain between the vehicles in the traffic lane.

13. The system of claim 8, wherein the processor is further adapted to responsive to modifications in the wireless communication links re-determining the count of number of vehicles.

14. The system of claim 8, wherein the processor is further adapted to assign an order number to the vehicles establishing wireless communication links based on at least one of the location of the vehicles in the traffic lane and a time of establishing the wireless communication links.

15. A method for managing vehicle traffic, the method comprising:

receiving, by at least one processing device associated with a first vehicle in a traffic lane, a request for traffic information of the traffic lane;

establishing, by at least one processing device, a wireless communication link with a device associated with at least one other second vehicle adjacent to the first vehicle and only in the traffic lane;

responsive to the request, collecting, by at least one processing device, unique information associated with each of the vehicles establishing wireless communication links in the traffic lane; and sending, by at least one processing device, the unique information to a control unit for managing traffic signals based on the unique information.

16. The method of claim 15, wherein the unique information includes at least one of an order number associated with a vehicle, vehicle name, travelling direction, dimension of the vehicles, and a count of the number of vehicles in the traffic lane.

17. The method of claim 15, further comprising sending updated unique information associated with each of the vehicle when a vehicle in the traffic lane performs at least one of establishes a wireless communication link in the traffic lane or abolishes the established wireless communication link.

18. A computer program product comprising computer-executable instructions embodied in a computer-readable storage medium for performing steps comprising:

receiving at a first vehicle in a traffic lane a request for traffic information of the traffic lane;

establishing, by at least one processing device, a wireless communication link with a device associated with at least one other second vehicle adjacent to the first vehicle and only in the traffic lane;

responsive to the request, determining a count of number of vehicles establishing wireless communication links in the traffic lane; and sending the count to a control unit for managing traffic signals.

19. The method of claim 1, wherein the first vehicle is the lead vehicle in the traffic lane, at least one processing device associated with the lead vehicle determines the count of the number of vehicles establishing wireless communication links in the traffic lane, and at least one processing device associated with the lead vehicle sends the count to the control unit.

20. The system of claim 8, wherein the first vehicle is the lead vehicle.

21. The method of claim 15, wherein the first vehicle is the lead vehicle in the traffic lane, at least one processing device associated with the lead vehicle collects the unique information associated with each of the vehicles establishing wireless communication links in the traffic lane, and at least one processing device associated with the lead vehicle sends the unique information to the control unit.

22. The computer program product of claim 18, wherein the first vehicle is the lead vehicle in the traffic lane, at least one processing device associated with the lead vehicle determines the count of the number of vehicles establishing wireless communication links in the traffic lane, and at least one processing device associated with the lead vehicle sends the count to the control unit.

* * * * *